Figure 1:
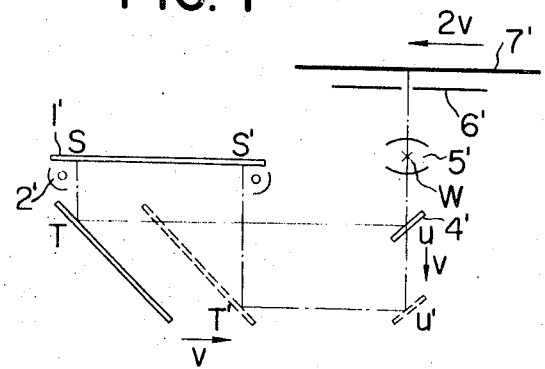

United States Patent

Kawakubo

[15] 3,642,366
[45] Feb. 15, 1972

[54] COPYING MACHINE

[72] Inventor: Kazuo Kawakubo, Kawasaki-shi, Japan

[73] Assignee: Canon Kabushiki Kaisha, Tokyo, Japan

[22] Filed: Dec. 22, 1969

[21] Appl. No.: 886,989

[30] Foreign Application Priority Data

Dec. 28, 1968 Japan..................................43/96021

[52] U.S. Cl...........................................355/8, 355/25, 355/66
[51] Int. Cl............................................................G03b 27/70
[58] Field of Search..................................355/3, 8, 25, 65, 66

[56] References Cited

UNITED STATES PATENTS 3,330,181   7/1967   Jakobson............................355/66 X
3,438,706   4/1969   Tanaka et al. .........................355/8 X

*Primary Examiner*—Samuel S. Matthews
*Assistant Examiner*—Richard A. Wintercorn
*Attorney*—Ward, McElhannon, Brooks & Fitzpatrick

[57] ABSTRACT

A copying machine having a slit for exposure of an original to be copied, a fixed copy stand on which the original is placed, and a pair of movable mirrors for scanning said original. The two mirrors are moved perpendicular to each other with the same speed so that the machine becomes compact in size and light in weight and the driving means is also simple.

12 Claims, 3 Drawing Figures

COPYING MACHINE

The present invention relates to a copying machine and more particularly a slit exposure copying machine of the type having a movable mirror, for optically scanning the original.

In the conventional copying machine such as the silver halide photography, the microphotography, electrophotography, it is imperative to project the image of an original upon a recording medium. For example, an electrophotographic apparatus is generally comprising means for imparting the charge uniformly upon a photosensitive member having a photoconductive layer, means for projecting the image of an original upon the photosensitive member, means for developing the electrostatic image with an electrophotographic developing agent containing the charged toner, means of transferring the developed image to a suitable recording medium and means for fixing the transferred image upon the recording medium.

The trend of the copying machine for use in office is toward making the copying machine compact in size and light in weight. For this purpose, it is the most effective method to making the optical system for projection of the image of an original compact in size.

There has been proposed a copying machine in which in order to make the machine compact in size the optical system is so arranged that the image of an original placed upon a movable original stand or holder is projected upon a movable photosensitive medium. However, the mechanism for moving both of the original holder and the photosensitive medium in synchronism with each other is very much complicated in construction and operation. It is very convenient to make copies from a thick and bulky original such as books which exerts much force upon the mechanism of the copying machine.

Accordingly, the primary object of the present invention is to provide an optical system for optically scanning the surface of an original by a mirror which is moved relative thereto while the original holder or stand and consequently the original placed thereupon are held stationary, thereby eliminating the defects encountered in the conventional copying machine.

For this purpose, it is very important to move both of the scanning mirror and the photosensitive medium in synchronism with each other. According to the present invention, this is accomplished with the provision of a first mirror which is adapted to move below the fixed original stand so as to scan optically the original placed thereupon, a second movable mirror which is adapted to move relative to the first movable mirror in such a manner that the light path length between the original and a movable photosensitive medium is always maintained constant and simple belt drive means instead of complicated gear train for displacing the first and second movable mirrors.

In the copying machine of the present invention, even a bulky original may be just placed upon the fixed original holder or stand when copied because the projection lens is also fixed. This arrangement makes the copying operation very simple and eliminates the use of complicated projection lens moving mechanism which must move the projection lens with a higher degree of accuracy. Thus the present invention provides a copying machine having many advantages.

One of the objects of the present invention is to provide an improved copying machine.

Another object of the present invention is to provide a copying machine in which an original holder or stand is fixed and which is compact in size and light in weight and inexpensive to manufacture.

A further object of the present invention is to provide a copying machine in which an original is optically scanned by a mirror and the image of the original is projected through a slit.

A still further object of the present invention is to provide a copying machine having first and second mirrors which are moved along the axes at a right angle with each other so as to make the copying machine compact in size.

A further object of the present invention is to provide a copying machine simple in construction, manufacture, assembly and adjustment and economical.

A still another object of the present invention is to provide a copying machine in which the movable mirrors are driven by belts thereby making simple the construction and manufacture of the copying machine.

Figure 2:
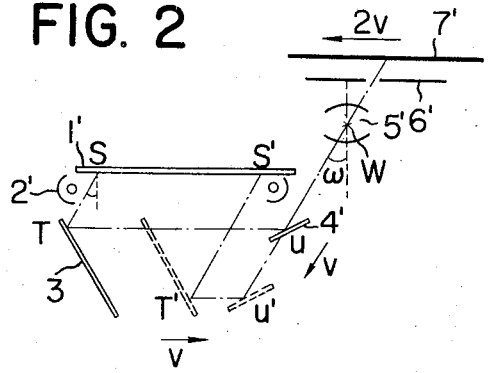
Figure 3:
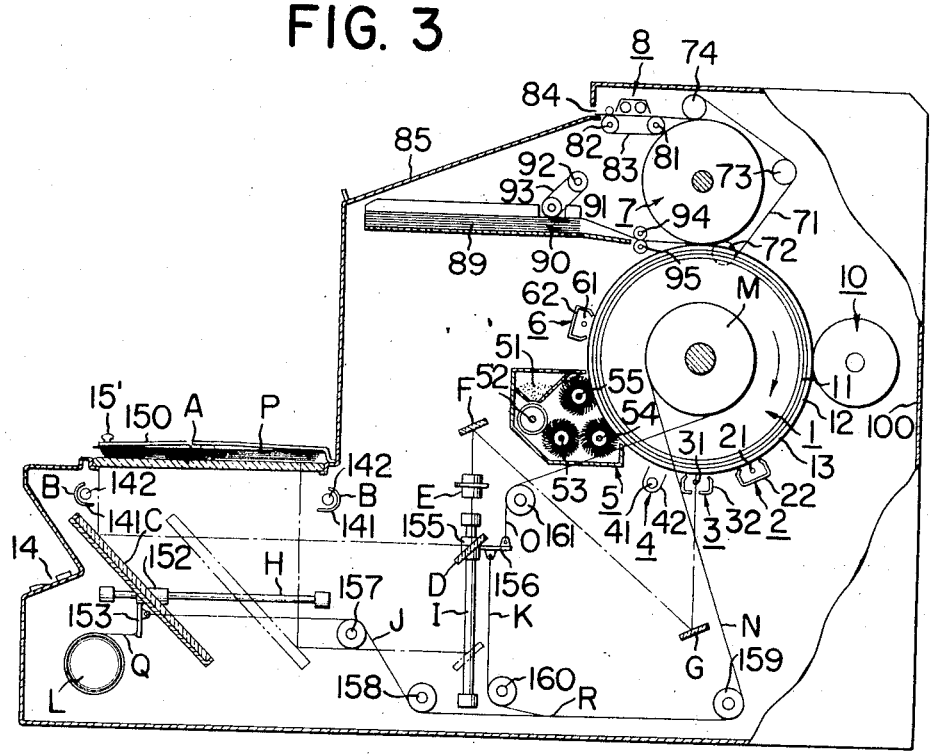

The above and other objects, features and advantages of the present invention will become more apparent from the following description of illustrative embodiments thereof with reference to the accompanying drawing, in which:

FIGS. 1 and 2 are schematic views illustrating a first and second embodiment of the optical system used in a copying machine in accordance with the present invention; and FIG. 3 is a diagrammatic side view of one embodiment of a copying machine in accordance with the present invention, incorporating therein the optical system shown in FIG. 1.

Referring to FIG. 1 illustrating an optical scanning system applied to a copying machine in accordance with the present invention, reference numeral 1' designates an original to be copied; 2', a light source for illuminating the original 1'; 3' and 4', movable mirrors; 5', an objective; 6', a slit; and 7', a photosensitive member. The description will be made when the original is copied at the same scale, but it will be understood that the original may be copied at a reduced or enlarged scale by suitably selecting the displacement velocity of the sensitized sheet.

The first mirror 3' is movable in parallel with the original surface SS' while the second mirror 4' is movable vertically of the original surface SS'. When both of these mirrors 3' and 4' are moved at the same speed $v$, the normal lines to the mirrors are perpendicular to each other. The image of the original 1' is projected through the projection lens 5' and the slit 6' upon the photosensitive member 7' which travels at the speed $2v$, i.e., twice as fast as that of the mirror. Both of the projection lens 5' and the slit 6' are held in stationary position along the axis of displacement of the second mirror 4'. The distance from the surface of the original 1' to the center W of the projection lens 5' (S-T-u-W, S'-T'-u'-W) is always maintained constant even when the mirrors are displaced so that the motions of the mirrors are made in complete synchronism with that of the photosensitive member in case of the optical scanning whereby the image of the original may be projected upon the photosensitive member with a high fidelity.

FIG. 2 shows an optical system of the second embodiment of the present invention also advantageously applied in a copying machine, for making the construction thereof compact in size. In this optical system, the photosensitive member 7' is exposed through the slit by the light which is incident upon the photosensitive member at an angle $w$. As in the case of the first embodiment illustrated in FIG. 1, the first mirror 3' scans the original surface SS' in parallel therewith but the second mirror 4' is caused to be displaced in the direction $u$-$u'$ at an angle of $w$ relative to the perpendicular line so that the optical system of the second embodiment may be made more compact in size as compared with that of the first embodiment. The angle $w$ is preferably less than 30°.

The common feature of the first and second embodiments resides in the fact that both of the first and second mirrors are moved at the same velocity.

FIG. 3 shows an electrophotographic copying machine in which the optical system of the first embodiment described with reference to FIG. 1 is incorporated. The copying machine is designed to carry out the novel electrophotographic process disclosed in copending applications Ser. No. 563,899; 571,538, filed on July 8, 1966; Aug. 10, 1966. In brief, the above process comprises the steps of primary charging a photosensitive member consisting of a conductive or nonconductive base upon which are laminated a photoconductive layer, and an insulating layer, projecting the image of an object to be copied by the radiation rays to which said photoconductive layer is sensitive while contemporaneously imparting the charge having the polarity opposite to that of said primary charging or applying the AC corona discharge to said photosensitive member, and exposing the whole surface of said photosensitive member by the radiation rays to which said photoconductive layer is sensitive, thereby forming a high-contrast electrostatic latent image upon said photosensitive member.

All of the parts or components are housed in a casing 100. A photosensitive drum 1 which is rotatably carried by a shaft is comprised of a conductive base 11, a photoconductive layer 12 and a translucent insulating layer 13. It is noted that according to the above process, instead of the translucent insulating layer, an opaque insulating layer may be used while the conductive base is made translucent, so that the image of an object to be copied may be projected from the inside of the drum. A primary charging means 2 comprises corona discharge electrode 21 and a shield plate 22 surrounding the electrode 21. The electrode 21 is connected to a power source not shown through a lead wire so that a suitable potential having a suitable polarity may be applied to the electrode 21. A corona discharge means 3 for effecting the charging and exposure contemporaneously according to the above process comprises a corona discharge electrode 31 and a shield plate 32 surrounding the electrode 31 and has its upper portion optically opened for permitting the exposure. The electrode 31 is connected to a power source not shown so that the charge having the polarity opposite to that of the primary charging by the charging means 2 is imparted to the drum 1 or the AC corona discharge may be applied thereto. The image of an original to be copied is projected by the scanning by the optical system to be described in more detail hereinafter, through the optically opened upper portion of the shield plate 32 of the corona discharge means 3 which contemporaneously imparts the charge to the drum 1. A device 4 for exposing the whole surface of the drum 1 comprises a light source 41 and a shield plate 42. It is noted that this exposure system 4 is not necessarily provided. A developing section generally indicated by reference numeral 5 comprises a roller 52 and developing brushes 53, 54 and 55, so that an electrostatic latent image formed in the preceding step may be developed by an electrophotographic developing agent 51. A charging means 6 comprises a corona discharge wire 61 connected to a power source not shown and a shield plate 62 surrounding the corona wire 61. Reference numeral 7 designates a transfer roller; 89, a paper feed stand; 90, a stack of copy sheets upon the stand 89; 92, A roller drivingly coupled to a drive means; 93, a belt; 91, a feed roller; and 94 and 95, a pair of copy sheet feed rollers. Reference numerals 72, 73 and 74 designate drive rollers and 71, a copy sheet conveyor belt. The copy sheet is fed by the feed roller 91 one by one from the stand 89 and is advanced by the pair of feed rollers 94 and 95, so that the copy sheet is pressed against the drum 1 by the transfer roller 7, whereby the developed image upon the drum 1 is transferred to the copy sheet. The transferred image is fixed in a fixing section generally indicated by 8 having a conveyor belt 83 wrapped over a pair of spaced drive rollers 81 and 82. The copy sheet discharged from the copying machine is received upon a stand 85. After the transfer of the image upon the drum 1 to the copy sheet, the drum 1 may be cleaned by a cleaning roller 10 so that the developing agent remained upon the drum 1 may be removed therefrom. Thus, the process for obtaining one copy is accomplished.

Next the optical system for projecting the image of an original through the slit and the optically opened upper portion of the exposure-charging means 3 will be described. An original P is placed upon a transparent stand A and securely held in stationary position by means of an original cover 150 having a knob 151. By holding the knob 151 and lifting the cover 150, an operator can place the original upon the stand A or remove the original P therefrom. A light source section B for illuminating the original P comprises a light source 142 and a shield plate 141. A first mirror C is displaced in parallel with the surface or the original P along a guide member H which facilitates the smooth displacement or motion of the mirror C. A sliding member 152 is fitted over the guide member H and is fixed to one end of the first mirror C so that the latter may be displaced smoothly. A projection 153 is extended from the slide member 152 and has one end of a forward drivebelt J and one end of a reverse drivebelt Q fixed respectively. The reverse drivebelt Q is connected to a reverse drive member L which is driven by a motor or spring. A second mirror D is so arranged as to displace itself always at a right angle relative to the first mirror C in the vertical direction in FIG. 3 so that the optical length from the original P and the photosensitive drum 1 may be maintained constant all the time, when the second mirror is displaced in synchronism with the first mirror C. A sliding member 155 is slidably fitted over a guide member I and one end of the second mirror D is fixed to the sliding member 155 so that the second mirror D may be smoothly displaced in the vertical direction. A projection 156 is extended from the sliding member 155 and one end of a forward drivebelt K and one end of a reverse drivebelt O are fixed to the projection 156 respectively.

A synchronous drum M is provided in coaxial relation with the photosensitive drum 1 so that the rotation of the drum 1 may be synchronized with the displacements of the first and second movable mirrors C and D. The belts J and K of the first and second mirrors C and D are wrapped over the synchronous drum M and one ends of these belts J and K are fixed to the drum M. In the instant embodiment, the belts J and K are joined at R to a common belt N which is wrapped over and fixed to the synchronous drum M. The reverse drivebelt O of the second mirror D is wrapped over the synchronous drum M in the direction opposite to that of the belt N and the other end of the belt O is fixed to the synchronous drum M. The reverse drivebelt Q of the first mirror C may be wrapped over and fixed to the synchronous drum M in the same manner as the belt O and in this case a suitable reversing mechanism is incorporated in the drum M.

An electromagnet clutch not shown in interposed between the synchronous drum M and the shaft S or the drum 1 in such a manner that the clutch may be released by a suitable detecting means not shown when the first mirror C reaches its right end and the second mirror D its lowermost position. Therefore, the synchronous drum M is freed so that by the reversing mechanism L, the drum M is caused to rotate in the direction opposite to that indicated by the arrow, whereby the first and second movable mirrors C and D are returned to their initial positions, respectively.

Reference characters E designates a fixed projection lens and F and G, mirrors for changing the direction of the optical path. The image of the original P which is illuminated by the lamp B and optically scanned by the first mirror C is projected upon the drum 1 through the projection lens E, the third and fourth mirrors F and G and the optically opened upper portion of the exposure-charging means 3. It is noted that when the drum 1 is exposed, the charge having the polarity opposite to that of the precharging or AC corona discharge is simultaneously imparted to the drum 1.

Reference numeral 14 designate an operation button; 157 and 158, guide rollers for the belt J; 160, a guide roller for the belt K; 159, a guide roller for the belt N; and 161, a guide roller for the belt O.

Next the mode of operation of the copying machine illustrated in FIG. 3 will be described. By the charging means 2, the surface of the insulating layer 13 of the drum 1 is uniformly charged with a positive or negative polarity so that the charge having the polarity opposite to the primary charging may be bound at the interface between the photoconductive layer 12 and the insulating layer 13 or in the photoconductive layer 12. Next the image of an original is projected upon the primary charged surface of the insulating layer 13 by the radiation rays to which is sensitive said photoconductive layer 12 while the charge having the polarity opposite to that of the primary charging or AC corona discharge is imparted contemporaneously to the drum by the exposure-charging means 3. Therefore, upon the surface of the insulating layer 13 is formed an electrostatic latent image of the original caused by the surface potential difference corresponding the light and dark pattern of the original. The projection of the image of the original will be described in more detail hereinafter. As the drum 1 rotates, the synchronous drum M rotates in the direction indicated by the arrow so that the belt N one end of which is fixed to the drum M is wound around thereupon. Consequently, the belts J and K which are joined to the belt N cause the first and second mirror C and D toward the right and downwardly respectively to the positions indicated by the two-dot chain lines, so that the first mirror C scans the original P, thereby projecting the image thereof upon the drum 1. When the scanning is accomplished, this is detected by the detecting means not shown so that the clutch not shown disconnects the synchronous drum M from the drum 1. Therefore, the drum M is rotated in the reversed direction by the reversing mechanism L as described hereinabove, so that the first and second mirrors are returned from the positions indicated by the two-dot chain lines toward their initial positions.

The insulating layer surface bearing the electrostatic image is uniformly illuminated by the exposure system 4 so that the contrast of the electrostatic image is increased. Thereafter, the electrostatic image is developed in the developing section 5 with the developing agent 51 mainly consisting of the charged, colored particles, so that the visible image is formed. Next the charge having a suitable polarity is imparted to the developed image by the charging means 6.

A copy paper is fed by the feed roller 91 one by one and advanced toward the transfer roller 7 by the pair of feed rollers 94 and 95 and the developed image upon the drum is transferred to the copy material in the manner described hereinabove. The copy sheet is advanced to the fixing section 8 by the conveyor belt 71 and the transferred image is fused and fixed to the copy sheet by heating. The copy material is discharged upon the receiving stand 85 through an outlet 84 of the casing 100. After the transfer of the image, the surface of the insulating layer 13 is cleaned by the cleaning roller 10 so that the remaining charged particles are removed so that the drum 1 may be prepared for the next operation.

The present invention has been described so far as being applied to a copying machine which is adapted to carry out the process described hereinabove, but it is understood that the present invention is not limited thereto. For example, the present invention may be applied to a process in which a photosensitive member consisting of a conductive base and a photoconductive layer formed thereon is charged, and exposed; and the image is developed and fixed upon the photosensitive member. It will be further understood that the present invention is also applied to the conventional copying machine utilizing microphotos, silver halide photography, etc.

In the copying machine in accordance with the present invention, the original as well as the projection lens are held stationarily so that even a thick or bulky original may be just placed upon the original holder. The present invention eliminates the use of the projection lens displacement mechanism which is complicated in construction and requires a high degree of accuracy in operation.

Both of the mirrors are displaced at the same speed so that only the simple mechanism for moving the mirrors at a velocity ratio of 1:1 is required. Therefore, the uses of complicated machine elements such as cams, gear trains, etc. may be eliminated, but only the simple belt drive is required. The second mirror may be compact in size and light in weight. The copying machine in accordance with the present invention is simple and inexpensive to manufacture, assembly and adjust and can be made compact in size and light in weight.

What is claimed is:

1. A copying machine in which an original is scanned optically by a mirror and the image of said original is exposed through a slit, comprising an original stand upon which is placed an original,
   a light source disposed downwardly of said original stand for illuminating substantially the whole width of said original placed upon said original stand,
   a first mirror movable in parallel with said original stand and placed downwardly of said light source,
   a second mirror movable in a direction different from the axis of displacement of said first mirror,
   means for displacing said first mirror from one end toward the other end of said original stand for scanning said original upon said original stand,
   means for displacing said second mirror while maintaining the lines normal to the first and second mirrors perpendicular to each other and varying the relative distance between the first and second mirrors,
   a projection lens fixed in the optical path for projection of the image of said original, and
   a photosensitive member which is moved at a predetermined velocity relation with said first and second mirrors.

2. A copying machine as defined in claim 1 wherein said second mirror is displaced along the axis perpendicular to said original stand.

3. A copying machine as defined in claim 1 wherein said second mirror is displaced along an axis so that the light from the original reflected by said second mirror may be at an angle of less than 30° relative to the vertical axis of said original stand.

4. A copying machine in which an original is scanned optically by a mirror and the image of the original is exposed through a slit, said copying machine comprising an original stand upon which is placed an original,
   a light source disposed downwardly of said original stand for illuminating substantially the whole width of said original placed upon said original stand,
   a first mirror movable in parallel with said original stand and placed downwardly of said light source,
   a second mirror movable in a direction different from the axis of displacement of said first mirror,
   means for displacing said first mirror from one end toward the other end of said original stand for scanning said original upon said original stand,
   means for displacing said second mirror while maintaining the lines normal to the first and second mirrors perpendicular to each other and varying the relative distance between the first and second mirrors,
   a projection lens fixed in an optical path for projection of the image of said original,
   a photosensitive member comprising a base, a photoconductive layer and an insulating layer laminated in this order and being caused to move in a predetermined velocity relation with said first and second mirrors,
   charging means, means for charging contemporaneously with the exposure through which are projected radiation rays to which said photoconductive layer of said photosensitive member is sensitive, developing means, image transfer means, and cleaning means all of which are arranged over said photosensitive member in spaced-apart relation with each other, and
   means for feeding copy material upon which is transformed the image from said photosensitive member.

5. A copying machine as defined in claim 4 wherein said charging means, said exposure-charging means, means for exposing said photosensitive member by the radiation rays to which is sensitive said photoconductive layer, said developing means and said cleaning means are arranged in sequential order upon said photosensitive member in spaced-apart relation with each other.

6. A copying machine in which an original is scanned optically by a mirror and the image of the original is projected through a slit, said copying machine comprising an original stand upon which is placed an original,
   a light source disposed downwardly of said original stand for illuminating substantially the whole width of said original stand,
   a first mirror movable in parallel with said original stand and placed downwardly of said light source,
   a second mirror movable in a direction different from the axis of displacement of said first mirror,
   means for displacing said first mirror from one end toward the other end of said original stand for scanning said original upon said original stand, means for displacing said second mirror while maintaining the lines normal to the first and second mirrors perpendicular to each other and varying the relative distance between the first and second mirrors, a projection lens fixed in an optical path for the projection of the image of said original, a photosensitive member comprising a conductive base and a photoconductive layer formed thereupon and being moved in a predetermined relation with said first and second mirrors, charging means, a slit through which is projected the image of said original, developing means, image transfer means and cleaning means all of which are arranged over said sensitized member in the order named in spaced-apart relation with each other, and means for feeding copy material upon which is transferred the image from said photosensitive member.

7. A copying machine in which an original is scanned optically by a mirror and the image of the original is exposed through a slit, said copying machine comprising an original stand upon which is placed an original, a light source disposed downwardly of said original stand for illuminating substantially the whole width of said original placed upon said original stand, a first mirror movable in parallel with said original stand and placed downwardly of said light source, a second mirror movable in a direction different from the axis of displacement of said first mirror, belt drive means for displacing said first mirror from one end toward the other end of said original stand, belt drive means for displacing said second mirror while maintaining the lines normal to the first and second mirrors perpendicular to each other and varying the relative distance between the first and second mirrors, drive means fore returning said first and second mirrors to their initial positions after scanning, a projection lens fixed in an optical path for projection of the image of said original, a slit through which is projected the image of said original, and a photosensitive member which is moved at a predetermined velocity relation with said first and second mirrors along the path in the vicinity of said slit.

8. A copying machine in which an original is scanned optically by a mirror and the image of the original is projected through a slit, said copying machine comprising an original stand upon which is placed an original, a light source disposed downwardly of said original stand for illuminating substantially the whole width of said original stand, a first mirror movable in parallel with said original stand in the horizontal direction and downwardly of said light source, a second mirror movable along the axis perpendicular to that of displacement of said first mirror, belt drive means for displacing said first mirror from one end toward the other end of said original stand, drive means for displacing said second mirror in synchronism with said first mirror, a projection lens fixed in an optical path for projection of the image of said original, a photosensitive drum rotatable in a predetermined velocity relation with said first and second movable mirrors, a synchronous drum disposed in coaxial relation with said photosensitive drum and connected thereto through a clutch, tension drive means for displacing said first and second mirrors as said photosensitive drum rotates, means for detecting the completion of said optical scanning by said first and second mirrors and disconnecting said clutch, belt means for driving said tension belt in the reversed direction so as to return said second mirror to its initial position after said scanning, means for returning said first mirror to its initial position after said scanning, and means for driving said first mirror-returning means.

9. A copying machine as defined in claim 8 wherein a belt for returning said first mirror to its initial position is wrapped over said synchronous drum in the direction opposite to that of said first mirror-driving belt, and means for driving said first mirror-returning belt is incorporated in said synchronous drum.

10. A copying machine as defined in claim 8 wherein said photosensitive drum comprises a conductive base, a photoconductive layer and a transparent insulating layer laminated upon said base in the order named;

charging means, exposure-charging means through which are projected the radiation rays to which is sensitive said photoconductive layer of said sensitized drum while the charge is imparted thereto contemporaneously, developing means, image transfer means and cleaning means are arranged over said sensitized drum in spaced-apart relation with each other in the order named; and paper feed means is disposed in the vicinity of said image transfer means.

11. A copying machine as defined in claim 10 wherein said charging means, said exposure-charging means, means for illuminating the whole surface of said photosensitive drum with the radiation rays to which is sensitive said photoconductor layer, said developing means, said image transfer means and said cleaning means are arranged in the order named over said photosensitive drum in spaced-apart relation with each other.

12. A copying machine as defined in claim 8 wherein said photosensitive drum comprises a conductive base and a photoconductive layer formed thereupon and said charging means, said slit, said developing means, said image transfer means and said cleaning means are arranged in the order named upon said photosensitive drum; and said copy sheet feeding means is disposed in the vicinity of said image transfer means.

* * * * *